United States Patent [19]

Lindstrom

[11] 4,076,909
[45] Feb. 28, 1978

[54] ALKALINE LEAD BATTERY

[75] Inventor: Olle B. Lindstrom, Taby, Sweden

[73] Assignee: AB Olle Lindstrom, Taby, Sweden

[21] Appl. No.: 759,834

[22] Filed: Jan. 17, 1977

Related U.S. Application Data

[63] Continuation of Ser. No. 616,662, Sep. 25, 1975, abandoned.

[51] Int. Cl.² .............................................. H01M 6/04
[52] U.S. Cl. .................................... 429/207; 429/218; 429/221; 429/222; 429/228; 429/229
[58] Field of Search ............... 429/207, 206, 221, 222, 429/218, 229–231, 228

[56] References Cited

U.S. PATENT DOCUMENTS

| | | | |
|---|---|---|---|
| 1,303,453 | 5/1919 | Benner et al. | 429/206 |
| 3,672,996 | 6/1972 | Louzos | 429/207 |

Primary Examiner—Charles F. LeFevour
Attorney, Agent, or Firm—Burns, Doane, Swecker & Mathis

[57] ABSTRACT

An accumulator battery, which may be called an alkaline lead battery, uses as negative material the typical electrode anode materials of the alkaline battery, e.g., iron, cadmium, etc., and as positive material lead dioxide or other difficultly soluble lead (IV) compounds which are formed thanks to the addition of anions like sulphate etc., to the alkaline electrolyte. During discharge the positive electrode material is reduced to lead (II) compounds containing the anion added to the electrolyte. The electrolyte has alkaline reaction during the whole cycle of charge and discharge.

7 Claims, 5 Drawing Figures

ALKALINE LEAD BATTERY

This is a continuation of application Ser. No. 616,662, filed Sept. 25, 1975, now abandoned.

BACKGROUND OF THE INVENTION

Alkaline accumulators and lead-acid batteries are most important power sources since a long time ago. Both have advantages and disadvantages and the two battery types cannot be said to compete on the market. The alkaline accumulators are much more expensive to manufacture than the corresponding lead-acid batteries since the positive electrodes contain expensive electrode materials, frequently nickel oxide, but sometimes also silver oxide. The today dominating embodiment of alkaline accumulators does furthermore use cadmium as negative electrode material, which is expensive and poisonous. Iron has therefore recently attracted attention as negative electrode material in alkaline accumulators.

The lead-acid battery has a bigger market than the alkaline accumulators depending on lower cost and satisfactory performance and life for many applications including traction applications. The lead-acid battery, however, uses heavy electrode and construction materials. The electrolyte in the lead-acid battery, most frequently sulphuric acid, is also consumed in the cell reaction contrary to the case with alkaline accumulators, where the composition of the electrolyte in general does not change during charge and discharge. The theoretically possible energy density for the acid-lead battery is therefore low.

Several new applications put up special requirements on the batteries, for instance traction applications like electric cars and stationary applications like load levelling batteries for power systems. Common features for these new applications are the demands on very low manufacturing costs, high efficiency in the energy conversion, simple design, no maintenance requirements, long life etc. In the traction application a high power and energy density is furthermore desired, which is a less pronounced requirement in the case of load levelling batteries for power grids, where first cost and life and, of course, the conversion efficiency are most important factors. There is, therefore, a need for a battery which combines the good properties of the lead-acid batteries and the alkaline accumulators. The present invention is concerned with such a new battery.

SUMMARY OF THE INVENTION

This invention represents namely a new physical combination of components from the alkaline batteries and components from the lead-acid battery, which is completely unexpected for the expert. The battery according to the invention utilizes namely the positive electrode of the lead-acid battery and a negative electrode taken from the alkaline accumulator, preferably an iron electrode, and an electrolyte which may be a mixture of the electrolyte of the alkaline accumulator and the electrolyte of the lead-acid battery, i.e., a water solution of an alkali sulphate and an alkali hydroxide. The invention thus refers to a rechargeable chemo-electric cell or an electric accumulator comprising such cells containing a positive electrode, an ion conducting electrolyte and a negative electrode and other means required for the operation of the cell characterized in that the active material in the negative electrode in its charged condition is iron, cadmium, magnesium, indium, or zinc and that the active material in the positive electrode in its charged condition is lead dioxide or other difficulty soluble lead (IV) compounds which are formed from lead dioxide and the anion in the electrolyte which is a water solution containing alkali hydroxide with alkaline reaction during the whole electrochemical cycle and a salt, the anion of which forms a compound with that positive electrode material at least in its discharged condition.

BRIEF DESCRIPTION OF THE DRAWINGS

In order that the invention be more readily understood reference is made to the accompanying drawings in which.

Figure 1:
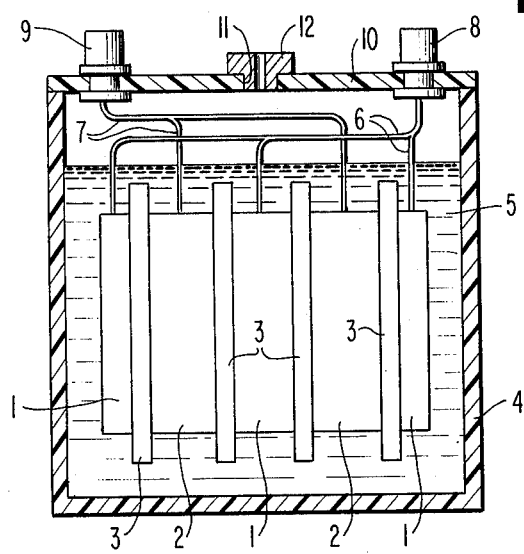
FIG. 1 is a cross section through the case of one embodiment of a storage battery according to the present invention showing the internal structure.

The invention will be exemplified in the following with a particularly advantageous embodiment where the negative electrode material is iron, Fe, and the positive material lead dioxide, $\alpha$-$PbO_2$, and the electrolyte a water solution of potassium hydroxide and potassium sulphate, for instance 3.5 Normal $KOH$ + 5 % $K_2SO_4$. The cell reactions during discharge of this cell can be described in the following way:

At the anode:

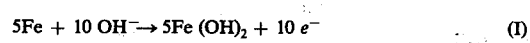

$$5Fe + 10\ OH^- \rightarrow 5Fe(OH)_2 + 10\ e^- \qquad (I)$$

At the cathode:

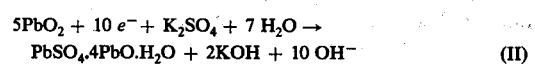

$$5PbO_2 + 10\ e^- + K_2SO_4 + 7\ H_2O \rightarrow$$
$$PbSO_4.4PbO.H_2O + 2KOH + 10\ OH^- \qquad (II)$$

Adding the two reactions, there is obtained:

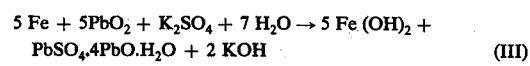

$$5\ Fe + 5PbO_2 + K_2SO_4 + 7\ H_2O \rightarrow 5\ Fe(OH)_2 +$$
$$PbSO_4.4PbO.H_2O + 2\ KOH \qquad (III)$$

It is also possible that the cell reactions follow a different course. At a lower alkalinity tri-basic lead sulphate may form instead of a tetra-basic lead sulphate etc. The important thing from a practical point of view is that the cell can take a load with current densities above about 5 $mA/cm^2$. The cell voltage is in general within the range 1-2 V and depends on the state of charge, the composition of the electrolyte and the current density. The cell can be charged thanks to the formation of electrochemically active salts with low solubility containing divalent lead thanks to the salt addition to the electrolyte which prevents the lead from going into solution as plumbite. Even if the reaction scheme is of a tentative character, it gives some information about the properties of the new power source. The alkalinity of the conductivity of the electrolyte increases during the discharge since water is consumed and sulphate ions are shifted against hydroxyl ions. This provides for an efficient use of the electrode materials. The volume changes of the systems are comparative small and therefore only moderate volume additions are necessary to make up for these volume changes.

There is no difficulty for the expert to design and manufacture power sources of the new kind for different purposes with the knowledge of the spirit of this invention. One is thereby not restricted to the system which has been discussed above, which, however, is particularly advantageous. Cadmium may for instance be used instead of iron, where one may preferably use known sintered, alternatively so-called pressed (with a plastic binder) electrodes, or so-called pocket electrodes. Also zinc electrodes can be used in various known embodiments, for instance with a catalytically active third electrode to prevent short-circuits through dendrites, addition of ions like $Ca^{++}$ to form zincates with low solubility, etc. The separator materials can be made of alkali resistant porous materials, like cellulose, cellophane, nylon, polypropylene, rubber etc. With respect to anode materials and separators one may rely on the use known technology for alkaline accumulators as described in U. Falk and A. Salkind, "Alkaline Storage Batteries", (John Wiley & Sons, Inc., 1969). Iron electrodes with high capacity density can preferably be manufactured according to the recipes in the Swedish Pat. No. 360952.

The positive plate follows a somewhat different electrochemical scheme than the positive electrode of the conventional lead-acid battery. It has, however, been found that known positive lead dioxide electrodes can be used in power sources according to the invention. An advantage is, however, that current conductors, grids and other supporting structures can be made in lighter and stronger materials, like nickel-plated iron, thanks to the alkaline environment in power sources according to the invention. The state of art in this is well described for instance in C. V. Vinal, "Storage Batteries", (John Wiley & Sons, Inc., 1967), or C. Drotschmann, "Bleiackumulatoren" (Verlag Chemie, 1951). It is also known that formation in an alkaline environment produces $\alpha$-$PbO_2$ with very good electrochemical and as well other properties. Tri-basic and tetra-basic lead sulphate are also known as very good electrode materials and are sometimes used as starting materials for the manufacture of positive electrodes for conventional lead batteries with acid electrolyte. It is in this case particularly advantageous to use as additive to the electrolyte-soluble sulphates like $K_2SO_4$, $Na_2SO_4$, $Li_2SO_4$, etc. It is thereby preferable to use an excess of sulphate for instance in the porous positive electrode, in which case the electrolyte is saturated with sulphate. In this way it is also possible to restrict the volume of the electrolyte and the sulphate formation during discharge is accelerated and the voltage stabilized. The sulphate concentration in the electrolyte should preferably exceed 0.01 - M and it is advantageous to be above 0.1 M, preferably around 0.2 - 0.4 M. The alkalinity increases during discharge and should preferably be within the range 0.5 - N to 12 - N. An advantageous range is frequently 2 - N to 8 - N. The electrolyte may also contain additives of other anions like carbonate, phosphate, silicate, zincate, etc., whereby the corresponding difficultly soluble lead salts or mixtures thereof are formed during discharge. Other known additives like sulphides as alkaline metal sulphides may also be used.

It is evident from the above discussion that alkaline batteries and lead-acid batteries of the state of art can easily be converted to power sources according to the invention by substitution of the positive or negative electrodes and change of the electrolyte composition. The alkaline environment gives great freedom with respect to choice of design materials, makes possible simple design of batteries with bipolar electrodes which is a difficult problem with batteries with acid electrolyte. The electrolyte may in its charged condition be 3 -N with respect to KOH and saturated with respect to $K_2SO_4$ which is arranged in the positive electrode material in sufficient demand for the above reaction scheme.

DESCRIPTION OF PREFERRED EMBODIMENTS

FIG. 1 shows the principle design of a power source containing three negative electrodes connected in parallel 1 and two positive electrodes 2 connected in parallel. The electrodes are separated by means of a separator 3 and contained in the cell vessel 4 with the electrolyte 5. The electrodes are connected with conductors 6 respectively 7 which are connected to the pole bolts 8 and 9 respectively which are situated in the cover 10 of the cell vessel which contains an opening 11 with a plug 12. The battery cell is thus built according to the state of art for alkaline accumulators and lead batteries but with positive and negative electrodes and electrolyte according to the present invention.

The power source according to FIG. 1 can be built up completely with components that are being used in lead-acid batteries and alkaline accumulators according to the state of art as has been discussed above. It is, however, particularly advantageous to use the kind of lead dioxide electrodes being used in modern traction batteries characterized by a very high porosity and with the active material arranged in a matrix of a porous, resistant structure, for instance, of porous polymer. It is also of advantage to use thin positive plates which give high utilization of the active material. In this case the cell will contain many electrodes connected in parallel.

As an illustration of a battery having electrodes in accordance with the embodiment shown in FIG. 1, the positive electrode can have the following composition prior to formation: 79 weight%PbO mixture, 16 weight % $K_2SO_4$, 2 weight % polyethylene binder and 3 weight % graphite.

The negative electrode can have the following composition: 100 % sintered carbonyl iron powder.

The electrolyte can have the following composition: 1-N KOH saturated with $K_2SO_4$.

Figure 2:
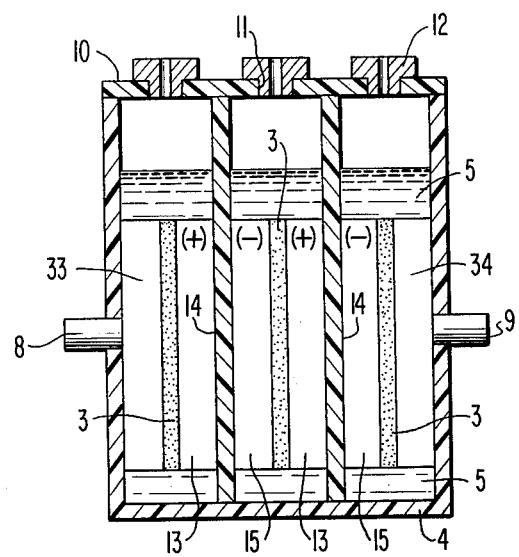
FIG. 2 is also a section through the case of a second embodiment in accordance with the invention showing the arrangement for a battery with bipolar electrodes.

FIG. 2 shows a design with bipolar electrodes. The positive electrode material 13 is $\alpha$-$PbO_2$ arranged on the separating wall 14 and contained in a porous body of nickel-plated iron. One may also dispose the active material on the separating wall in other ways, for instance by means of pocket, grid, or tubular structures. These structures may then be manufactured by nickel-plated steel. This gives an important cost reduction for positive plates for power sources according to the invention compared to the cost for positive plates for conventional lead-acid batteries with an electrolyte containing sulphuric acid. With bipolar electrodes the electrode conductivity is of less importance and the main function of the structure is to keep the active material in position and provide the electric contact with the separating wall. The active negative material 15, in this case iron, is manufactured according to the Swedish Pat. No. 360952. The cross-section of the cell if 420 cm$^2$ and the cell pitch 2.6 cm, of which 0.5 cm refers to the negative material and 0.8 cm to the positive material. The electrolyte is in charged condition 3-N with respect to KOH. Every cell room contains 150 grams of K$_2$SO$_4$ in solid form at 25° C, discounting sulphate dissolved in the electrolyte. Batteries according to FIG. 2, where these main data give energy densities within the range 2-300 KWh /m$^3$ which is several times better than for conventional lead-acid batteries and nickel cadmium batteries.

The positive electrode material may of course also be generated by formation of, for instance, partially reduced PbO, that is, lead oxide containing metallic lead. This material is, according to the state of art, being used as a raw material in the manufacture of so-called pasted, positive plates for conventional lead-acid accumulators. A corresponding formation of positive plates for alkaline lead accumulators according to the invention with formation in alkaline electrolyte, however, with no special additions of sulphate etc., to the formation electrolyte produces $\alpha$PbO$_2$ in the known way. During subsequent cycling with electrolyte according to the invention may, however, other difficultly soluble lead (IV) compounds be generated in the charged electrode. A positive plate for the battery according to FIG. 2 can be made by formation of a PbO-mixture in the following way. 2 kilogrammes of powdered Pb, PbO of conventional battery grade, is mixed with 0.4 kilogrammes of finely ground K$_2$SO$_4$, then moistened with 1-N KOH and worked into the supporting electrode structure, which could be known grid or mesh structures. The electrode material is then let to mature for 24 hours at 80° C in wet air, after which formation is taking place in an electrolyte consisting of, for instance, 1-N KOH, 1-N KOH saturated with K$_2$SO$_4$, or a neutral saturated K$_2$SO$_4$ solution. Cycling is then taking place in 1-N KOH saturated with K$_2$SO$_4$, whereby the electrode in its charged condition does not look entirely as a corresponding conventional positive lead dioxide electrode, from which one may assume that the active electrode material may contain other compounds than $\alpha$-PbO$_2$. These compounds have, however, not been identified. If the addition of K$_2$SO$_4$ to the electrode material is replaced with an equal amount of K$_2$S, there will be a more pronounced difference in appearance. Electrodes with sulphide additive give frequently higher capacity density than corresponding electrodes with sulphate additive. The lead (IV) compounds present in charged electrodes with sulphide additive have not been identified either.

It should furthermore be added that it is suitable to stabilize the structure of the electrodes described above in the known way by means of polymeric binders, for instance, with 2% polyethylene powder like Microethene MN 722 which is mixed into the electrode material prior to maturing, and sintered at 120° C. The electric conductivity may be improved in the known way by addition of 3% graphite powder. The recipes given above serve only the purpose to give a concrete illustration of suitable positive electrodes for batteries according to the invention.

Batteries in accordance with FIG. 2 are conveniently constructed with poles 8 and 9 on the sides of the casing 10, these being connected to the terminal electrodes 33 and 34 of respective polarity. Vent holes 11 and vented plugs 12 are provided with the usual manner.

Figure 3:
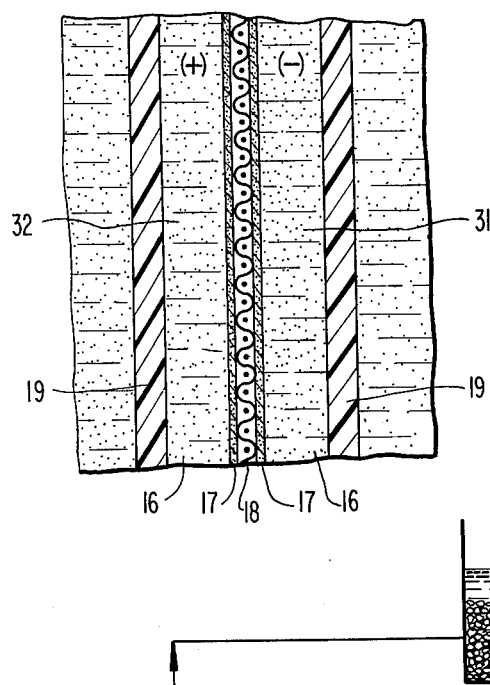
FIG. 3 is an enlarged schematic representation of a portion of a battery having large bipolar electrodes for load levelling batteries in accordance with the invention.
Figure 5:
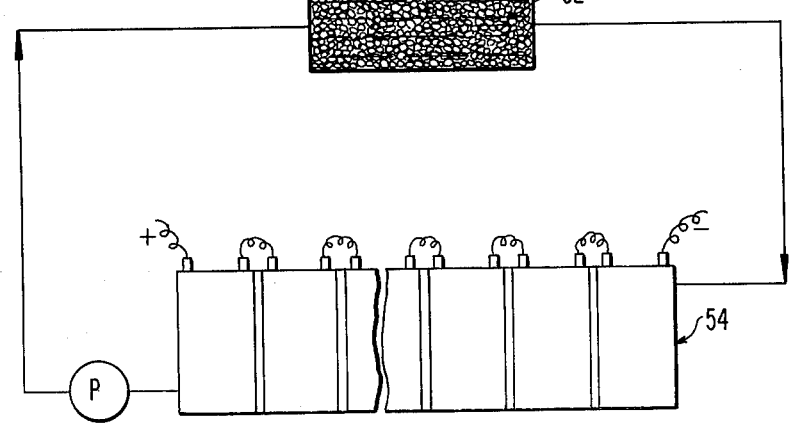
FIG. 5 is a schematic representation of one system for circulating the electrolyte through a bed of solid salt to maintain a high concentration of anion.

FIG. 3 shows a portion only of an embodiment with bipolar electrodes of a large size for load levelling batteries. In this case the batteries are built up of a series of pockets 16 separated from each other by separators 17 and supporting structures 18, and separating walls 19 for the bipolar electrodes. The active materials 31 and 32 are added as powders. The positive electrode material may then contain addition of sulphate, sulphide, etc., as described above. It is also suitable with these large electrodes to maintain a high concentration of the anion in question during the whole discharge step by means of circulating the electrolyte 51 through a bed 52 containing the salt in question. This bed 52 is preferably arranged in a separate vessel 53 as shown in FIG. 5 which illustrates such an arrangement with a bank 54 of such batteries. The electrolyte 51 may then preferably be introduced first into the negative electrode material 31 in FIG. 3 and thereafter into the positive electrode material 32 via the separators 17. In this way the alkalinity of the electrolyte entering the positive electrode material will be somewhat reduced thanks to the anode reaction during discharge which is of benefit for the cathode reaction. This scheme is also of advantage with the monopolar designs shown in FIG. 1. Large cells with monopolar electrodes for e.g., load levelling, may in practice be built as diaphragm cells used for the production of chlorine and alkali, see e.g., the book "Chlorine", ACS Monograph No. 154, by James S. Scone (1962) p. 94 seq., or U.S. Pat. Nos. 2,987,463 and 3,591,483. The electrolyte, e.g., 1-N KOH, is saturated in separate vessel (53), the saturator, with K$_2$SO$_4$ at about 50° C, and is then fed by gravity into the anode space of the cell. The electrolyte is fed by gravity from here via the diaphragm into the cathode spaces, which contain the positive electrode material. The electrolyte is then pumped back to the saturator and again recirculated to the anode spaces of the cell. The man skilled in the chlor-alkali technology will experience no problems whatsoever applying his art in this particular embodiment of the invention. It is, however, again emphasized that it has not yet been possible to identify which lead (IV) compounds are present in the positive electrode under these conditions, which are characterized by an elevated temperature and flow of electrolyte within and through the electrode. This will reduce the concentration gradients of the anion in question in the electrode, thus creating a different environment compared to the case of an electrode with a stagnant internal electrolyte phase.

The positive and negative active materials can have the same compositions, respectively as in the embodiment of FIG. 2. These embodiments give high energy density, low production cost and long life and are particularly useful for load levelling.

FIGS. 1 and 2 show power sources in so-called vented configuration, in which case the charging gases being developed particularly at the end of the charge leave freely through the vent hold. It has also been found that power sources according to invention can preferably be designed in sealed configuration. The negative electrode material, for instance iron, can thereby be present in excess, in this case counted on the first discharge step of the iron. Oxygen developed during charge reacts with the active electrode material. Hydrogen whicy may be generated through self-discharge reacts unexpectedly easily with the lead compounds in the positive material during the conditions prevailing in the power source according to the invention.

Figure 4:
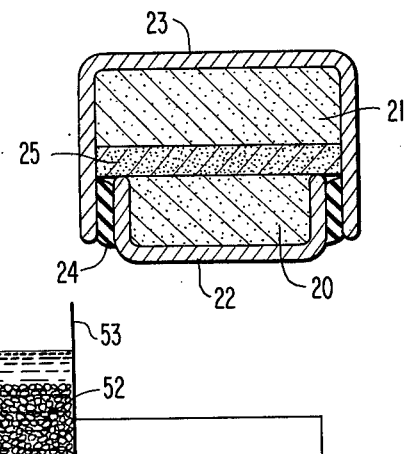
FIG. 4 is a section through a "button-type" battery made in accordance with the present invention.

The invention can also with advantage be used with smaller battery cells like sealed button cells and batteries with cylindrical shape. FIG. 4 shows an enlarged cross-section of such a button cell. The porous iron anode 20 and the porous lead dioxide electrode 21 are arranged in two cans 22 and 23 which are isolated from each other with an epoxy resin 24 which at the same time serves as a sealing for the cell. The iron electrode has been sintered directly in it can according to the description in the Swedish Pat. No. 360952. The active lead material has been put in as α-PbO$_2$. The separator 25 is a layer of porous polyvinyl chloride. Cells of this kind can be connected to batteries with any voltage and may be used in electronic apparatus like calculators, television sets, etc. Cells of this type can also be made with a fairly large diameter, for instance, 50 mm, and with varying electrode thicknesses up to 10 mm for the iron electrode or above, and with corresponding thicknesses for the lead electrode. Such so-called plate cells with square, rectangular, or hexagonal form can be piled up to batteries for fairly demanding applications like power sources for electrically powered lawn mowers, etc.

Power sources according to the invention comprise a new class which is a bridge between the earlier known alternative systems, that is the alkaline accumulators and the lead-acid battery. Great possibilities exist with knowledge of the spirit of this invention to design and manufacture other power sources than those described above for special applications using the state of art within each field and the information given above.

It is recognized that the above description of power sources according to the invention gives fairly large advantages. One difficult problem with alkaline accumulators of nickel/iron type or the nickel/cadmium type is the low performance of the nickel oxide electrode and its high manufacturing cost. The fact that the alkaline accumulators have but a small traction market is due to these circumstances. Lead dioxide electrodes can be manufactured in a fairly simple way and in a large thickness without decrease of the power density. On the other hand, it is quite difficult to increase the thickness of the so-called sintered nickel oxide electrodes. Therefore, so-called pocket electrodes are preferred for systems with high energy density which on the other hand have poorer power density and low energy density counted on volume and weight. The new power source with the positive electrode of the lead battery arranged in an alkaline accumulator therefore gives a very important increase of performance and cost reduction. The new power source exhibits excellent properties which count to more than a hypothetical average for the lead-acid battery and the alkaline accumulator.

Although the invention has been described with reference to certain specific embodiments it will be apparent that these are illustrative only and that equivalents and variations within the scope of the invention will suggest themselves to those skilled in the art.

I claim:

1. An electric storage battery comprising at least one electrochemical cell having a positive electrode, a negative electrode, and an electrolyte comprising an alkaline-reacting aqueous solution containing an alkaline hydroxide in sufficient amount to impart an alkaline reaction during the complete electrochemical cycle and a salt whose anion forms a difficultly soluble compound with the positive electrode material at least in its discharged condition, the active material of said negative electrode in its charged condition being a member of the group consisting of iron, cadmium, magnesium, indium, and zinc, the active material of said positive electrode in its charged condition comprising lead dioxide or a difficultly soluble tetravalent lead compound formed by the reaction of lead dioxide and the anion in the electrolyte, the active material of said positive electrode in its discharged condition comprising a difficultly soluble divalent lead compound formed by reaction of the electrode material with the anion in said electrolyte, said salt being present in an amount sufficient to prevent the active material of the positive electrode in its charged and discharged condition from going into solution.

2. Electric storage battery according to claim 1 wherein the active material in the negative electrode is iron.

3. Electric storage battery according to claim 1 wherein the electrolyte contains alkali sulfate.

4. Electric storage battery according to claim 1 wherein the electrolyte contains an alkali sulfide.

5. A battery in accordance with claim 1 wherein the anion is a member of the group consisting of sulfate, carbonate, phosphate, silicate, and alkali metal sulfide.

6. Electric storage battery according to claim 3 wherein in that the electrochemical cell contains a sulfate in solid form which is brought to react with the positive electrode material during discharge.

7. Electric storage battery according to claim 3 wherein the electrochemical cell is provided by separate means for saturating the electrolyte with a sulfate.

* * * * *